US012744311B2

(12) United States Patent
Wade

(10) Patent No.: US 12,744,311 B2
(45) Date of Patent: Sep. 22, 2026

(54) RADIAL LINE SLOT ANTENNA ARRAYS

(71) Applicant: BAE SYSTEMS PLC, London (GB)

(72) Inventor: Ashley Lloyd Wade, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 128 days.

(21) Appl. No.: 18/847,873

(22) PCT Filed: Mar. 16, 2023

(86) PCT No.: PCT/GB2023/050636
§ 371 (c)(1),
(2) Date: Sep. 17, 2024

(87) PCT Pub. No.: WO2023/180692
PCT Pub. Date: Sep. 28, 2023

(65) Prior Publication Data

US 2025/0202105 A1 Jun. 19, 2025

(30) Foreign Application Priority Data

Mar. 21, 2022 (EP) .................................... 22275032
Mar. 21, 2022 (GB) ...................................... 2203916

(51) Int. Cl.
*H01Q 3/24* (2006.01)
*H01Q 1/22* (2006.01)
*H01Q 21/00* (2006.01)

(52) U.S. Cl.
CPC ............. *H01Q 3/24* (2013.01); *H01Q 1/2283* (2013.01); *H01Q 21/0012* (2013.01)

(58) Field of Classification Search
CPC ..... H01Q 3/24; H01Q 1/2283; H01Q 21/0012
See application file for complete search history.

(56) References Cited

U.S. PATENT DOCUMENTS 7,411,472 B1 8/2008 West et al.
2004/0227678 A1* 11/2004 Sievenpiper ........... H01Q 1/243 343/702

(Continued)

FOREIGN PATENT DOCUMENTS

JP 2009-111210 A2 5/2009
WO WO2023180692 A1 9/2023

OTHER PUBLICATIONS

Search Report under Section 17(5) received for GB application No. 2203916.8, mailed Aug. 26, 2022 3 pages.

(Continued)

*Primary Examiner* — Dieu Hien T Duong
(74) *Attorney, Agent, or Firm* — Arcane Law PLLC

(57) ABSTRACT

In some examples, a method for manufacturing a switching structure for a radial slot line antenna, RLSA, array using a single semiconductor wafer element, comprises forming a set of active switching devices within the wafer element, a position of each active switching device on the wafer element selected according to a predefined configuration representing a slot element layout for the RLSA array, and forming driving circuitry within the wafer element, the driving circuitry for individually addressing respective ones of the set of active switching devices, whereby to enable selected bias signals to be applied to the set of active switching devices.

15 Claims, 4 Drawing Sheets

(56) References Cited

U.S. PATENT DOCUMENTS

| | | | | |
|---|---|---|---|---|
| 2005/0206573 | A1* | 9/2005 | Iigusa .................... | H01Q 15/10 343/770 |
| 2018/0062269 | A1* | 3/2018 | Kishimoto ............... | H01Q 3/24 |
| 2018/0287254 | A1 | 10/2018 | Nakano | |
| 2021/0050671 | A1 | 2/2021 | Stevenson et al. | |

OTHER PUBLICATIONS

International Search Report and Written Opinion received for PCT application No. PCT/GB2023/050636. Mail date: May 25, 2023. 10 pages.

Extended European Search Report received for EP application No. 22275032.5, mailed Sep. 7, 2022. 9 pages.

Mohamadi, Fred, "Wafer-scale integration brings low cost and a small footprint to active antenna arrays," retrieved from the internet at www.rfdesign.com, (Feb. 2005). pp. 48-64.

Horikawa, et al., "Resonant-tunneling-diode terahertz oscillator integrated with a radial line slot antenna for circularly polarized wave radiation," Semiconductor Science and Technology, (Oct. 12, 2018), vol. 33, No. 11. pp. 1-9.

Rebeiz, et al., "Wafer-Scale Millimeter-Wave Phased-Array RFICs," IEEE Compound Semiconductor Integrated Circuit Symposium (2014). 4 pages.

* cited by examiner

RADIAL LINE SLOT ANTENNA ARRAYS

FIELD

The present invention relates to antenna arrays. Aspects relate to radial slot line antenna arrays.

BACKGROUND

The size, weight, power consumption and cost of implementation of an antenna or antenna array in a platform can be prohibitive, leading to sub-optimal deployments in which, e.g., certain desired functionality may be sacrificed in favour of a lower cost or smaller sized alternative. For example, active electronically scanned antenna arrays (AESA) as well as passive electronically scanned antenna arrays (PESA) are heavy, expensive and require large amounts of electrical power to operate and keep cool. Similarly, passive reflector type antennas are large and not conducive to implementation on certain platforms, such as on modern aircraft for example where (at least) their size can interfere with the aerodynamic profile of the platform.

In order to reduce cost and size, some antenna structures use a single voltage source to drive the elements of the antenna, thereby reducing the physical size of the structure and its implementation cost. However, by using only a single source, individual elements cannot be selectively controlled. This therefore limits the use in terms of the emitted beam because, e.g., the array cannot be scanned. Phase shifters or time delay devices can be employed in order to provide a degree of control for an emitted beam, but these are lossy as they are generally ferrite based, thereby leading to inefficiencies. In the case of phase shifters, they are also generally narrow band. Conversely, a transmitter provided for each antenna element can provide full control of the phase and amplitude of an emitted beam, enabling scanning for example. However, such systems are expensive and generally large as a result of, e.g., the increased real estate required for the driving mechanism. Accordingly, there is often a trade-off between implementing an antenna that is expensive and/or large/heavy but efficient and more controllable, or cheaper and/or smaller/lighter but less efficient and less functionally useful.

SUMMARY

According to a first aspect of the present disclosure, there is provided a method for manufacturing a switching structure for a radial slot line antenna, RLSA, array using a single semiconductor wafer element, the method comprising forming a set of active switching devices within the wafer element, a position of each active switching device on the wafer element selected according to a predefined configuration representing a slot element layout for the RLSA array, and forming driving circuitry within the wafer element, the driving circuitry for individually addressing respective ones of the set of active switching devices, whereby to enable selected bias signals to be applied to the set of active switching devices.

Accordingly, a wafer element can be manufactured such that it effectively forms a large scale (i.e., wafer scale) integrated circuit forming a switching structure or surface for the antenna array. This eliminates issues surrounding wafer dicing and packaging and provides performance enhancements as no bond wires are required linking components to control circuitry, which can be a cause of failure of components whilst also adding considerable amounts of parasitic reactance, which itself has a significantly detrimental impact on the performance of an antenna element.

In an implementation of the first aspect, an array of slot elements for the RLSA array can be fabricated on the wafer element by forming multiple slots according to the predefined configuration representing the slot element layout for the RLSA array. An array of slot elements for the RLSA array can be fabricated on a substrate structure for the RLSA array. In an example, the substrate structure can be bonded to the wafer element. A plurality of bias control lines can be provided within the wafer element for the set of active switching devices. A plurality of bias control lines can be formed on a control layer. The control layer can be formed within the wafer element. The control layer can be bonded to the wafer element.

According to a second aspect of the present disclosure, there is provided a radial slot line antenna array, comprising a substrate comprising a radiating surface for the array, the radiating surface comprising multiple slots arranged in a predefined configuration representing a slot element layout for the RLSA array, a set of active switching devices integrally formed in a semiconductor wafer element bonded to the substrate, each switching device structurally aligned with a respective slot, whereby to enable regulation of slot element resonant frequencies, a plurality of bias control lines integrally formed in the semiconductor wafer element, and driving circuitry integrally formed in the semiconductor wafer element and configured to individually address the active switching devices, whereby to enable selected bias signals to be applied to the active switching devices using the bias control lines.

In an implementation of the second aspect, at least some of the set of active switching devices can comprise Micro-Electromechanical System, MEMS, switches. The MEMS switches can comprise charge controlled or field-controlled MEMS switches. At least some of the MEMS switches can comprise cantilever, bridge or diaphragm type MEMS. At least some of the set of active switching devices can comprise varactor diodes and/or mempacitors. The driving circuitry can comprise at least one high voltage driver configured to supply a high voltage bias signal. The radiating surface can comprise a metallic layer interposed between and bonded to the semiconductor wafer element and the substrate.

BRIEF DESCRIPTION OF THE FIGURES

Embodiments of the invention will now be described by way of example only with reference to the figures, in which.

DETAILED DESCRIPTION

Figure 1:
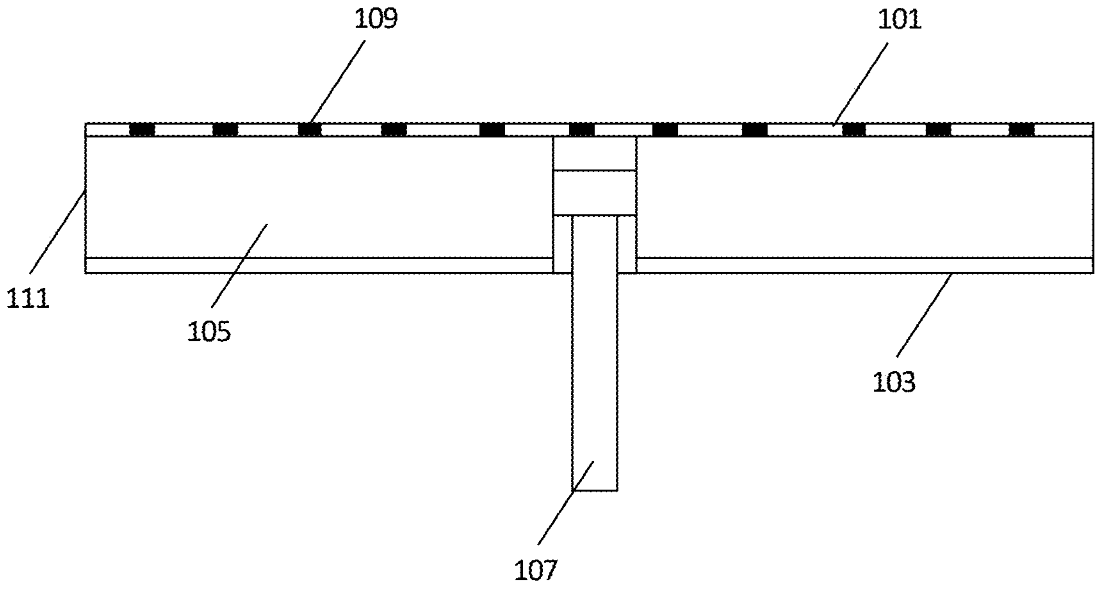
FIG. 1 is a schematic representation of an RLSA array according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

A radial line slot antenna (RSLA) is a low-cost antenna structure comprising a radiating element, a cavity, a background plate and a feed to supply a signal for the radiating element. The radiating element and the background plate generally comprise a pair of metallic disks, such as aluminium, copper, brass, or molybdenum separated by the cavity and thereby forming a parallel plate waveguide, fed in the centre by the feed, which can be, e.g., a coaxial feed or waveguide transition. The cavity between the parallel plates can be filled with a low permittivity substrate such as a dielectric material, or slow wave structure. This can help to prevent the formation of grating lobes in the far-field pattern. In conjunction with the radiating element and the background plate, the cavity operates as a circular waveguide that guides a signal from the feed so that it propagates in a radial direction.

An RLSA typically comprises multiple through slots or apertures in the radiating element, notionally configured as multiple slot pairs, in which each pair effectively acts as an antenna element for the RLSA such that all of the multiple slot pairs of the radiating element form an array antenna. The slot pairs are arranged in a predetermined pattern that is configured to produce a fixed beam at a given frequency in a given polarisation, and slots of a slot pair are typically arranged relative to one another such that their long axes are orthogonal to one another. The orientation of the slots can be determined by analysing the vector of the field propagated by each slot in the array and it is common to consider the slots of a slot pair as being in phase and out of phase and then using the cumulative sum of these sets of slots to achieve the desired polarisation.

FIG. 1 is a schematic representation of an RLSA array according to an example. The RLSA array comprises a radiating element 101, a cavity 105, a background plate 103 and a coaxial feed 107. Multiple slots 109 are provided in the radiating surface 101. Slots 109 form discontinuities in the radiating surface. Accordingly, a signal from feed 107 will cause a voltage to develop across the slots. Walls 111 can be a conductive material or left open or terminated in a lossy material. There are numerous ways in which slots can be positioned in the radiating element and the methods described herein are agnostic to the overall slot pattern. For example, a two-dimensional spiral slot array can be used. In the example of FIG. 1, the RLSA array is depicted in the form of a single layer structure. However, such arrays can be implemented with dual layer feed structures.

According to an example, the resonance of at least one of the multiple slots can be controlled or varied by regulating or selecting a value of capacitance of a variable capacitance device provided across the slot. That is, the resonant frequency of slots can be tuned by varying a capacitance of the slots. Since a beam pattern for the RLSA will vary depending on the state of activity of the slots, various beam patterns can be generated using various combinations of capacitance for a slot or slots in order to vary the degree to which they are in resonance. Thus, given a desired beam pattern for the array, a slot activation configuration can be used to define a set of slots to be switched on or off (or be in a semi-active state of emission). The state of emission of a slot is dictated, in an example, by the capacitive reactance for the slot in question. Such a value can be selected to effectively prevent a slot from being in a state in which it is radiating, in a state in which it is radiating at a maximum value, or somewhere in between these extremes. Accordingly, in tuning the resonant frequency of slots, the value for antenna gain for a given combination of capacitance values associated with slots of the array gives rise to a beam pattern due to the couplings between the slots in their various states of activity.

According to an example, a slot can be switched on or off, or provided in a semi-active state, by applying a capacitance selected from one of multiple values, which may be discrete values for example. Accordingly, a desired beam pattern to be emitted by the array may relate to a slot activation configuration in which a proportion of the slots are radiating at a first level, a proportion of the slots are radiating at a second level and so on. The first level can correspond to a slot being, effectively, off, whilst the second level can correspond to a slot being, effectively, on and radiating at or close to resonance. In between these states, various other levels of slot activity can be provided in which slots are radiating below resonance but are not 'off', depending on the prevailing value of capacitance for a slot or slots.

In an example, the resonant frequency of a slot can be regulated or selected using an active switching device. An active switching device can comprise any of a micro-electromechanical system (MEMS) switch, a varactor diode, and a mempacitor. The MEMS can be a radio-frequency MEMS (RF MEMS). In an example, the RF MEMS is a capacitive RF MEMS. That is, the contact interface of the RF MEMS can be capacitive for example. A capacitive RF MEMS according to an example can be biased below its pull-in voltage in order to enable control over the resonance of a slot over which the capacitive RF MEMS is positioned. Accordingly, as noted above, a capacitance from one of multiple values, which may be discrete values for example, can be selected, whereby to ultimately enable beam steering using an RLSA. An RF MEMS used according to an example can be, e.g., a capacitive MEMS or a cantilever type MEMS.

Reference to MEMS switches from hereon in is not intended to be limiting, but merely represents one of many active switching devices that can be implemented according to an example.

Typically, MEMS switches are fabricated on a die which is a portion of a semiconductor wafer, which can be up to around 300 mm in diameter for example. On a single wafer there may be 100's to 1000's of dies depending on the die size. Dies may range from 1 or 2 mm to 10's of mm. To enable packaging, a die is removed from the wafer by dicing the wafer by scribing and breaking, etching (deep reactive ion etching), sawing or laser cutting. The dies removed from the wafer can then be packaged. Individually packaged dies are then bonded to a structure in order to provide the desired functionality.

According to an example, instead of manufacturing an active switching device, such as capacitive RF MEMS on a die, dicing them up and packing them, a wafer element can be so manufactured as to form a large integrated circuit which forms a switching structure for an RLSA. Such a switching structure can comprise, e.g., a substrate comprising a metal ground plane with a number of etched slots on it. The slots may be rectangular or may have another format in order to be resonant at the desired frequency of RF radiation. In an example, principal frequencies of operation can comprise a band within the X, Ku, K and Ka bands (as defined by the IEEE). A wafer element can be a 4 to 8 inch wafer for example, although other wafer sizes can be used.

According to an example, in addition to slots, a number of bias control lines to apply an actuation voltage to an active switching device can be provided, along with a semiconductor transistor or alternative comparable switch located adjacent to an active switching device. The location need not be identical in relation to the slot across the array to aid in the lithography process. For example, this enables individual capacitive RF MEMS to be turned on or off across the surface of an RLSA. In an example, these elements are manufactured on a single wafer element, thereby avoiding the need for wafer dicing and packaging and thus providing an improvement over the existing method of packaging large quantities of switches followed by reflow soldering semiconductor devices or packaged MEMS onto a printed circuit board (PCB) at a pitch that is typically not dissimilar to the pitch of the bare dies as fabricated on a wafer. Furthermore, performance enhancements are provided since no bond wires are used to link components to control circuitry. Bond wires, used when packing bare dies into a format that can be soldered directly to a PCB, are a cause of failure of components whilst also adding considerable amounts of parasitic reactance that can have a significantly detrimental impact on the performance of an antenna element they are used to tune. In addition, tuning can be undertaken across the wafer surface in the process of fabrication to ensure that the tuneable capacitance is uniform across the whole array and to take account of and correct fabrication variation in the wafer fabrication process, which may mean devices manufactured in the centre of a wafer are different to those on the edge of the wafer. Such tuning would be challenging if discrete components were to be used.

Figure 2:
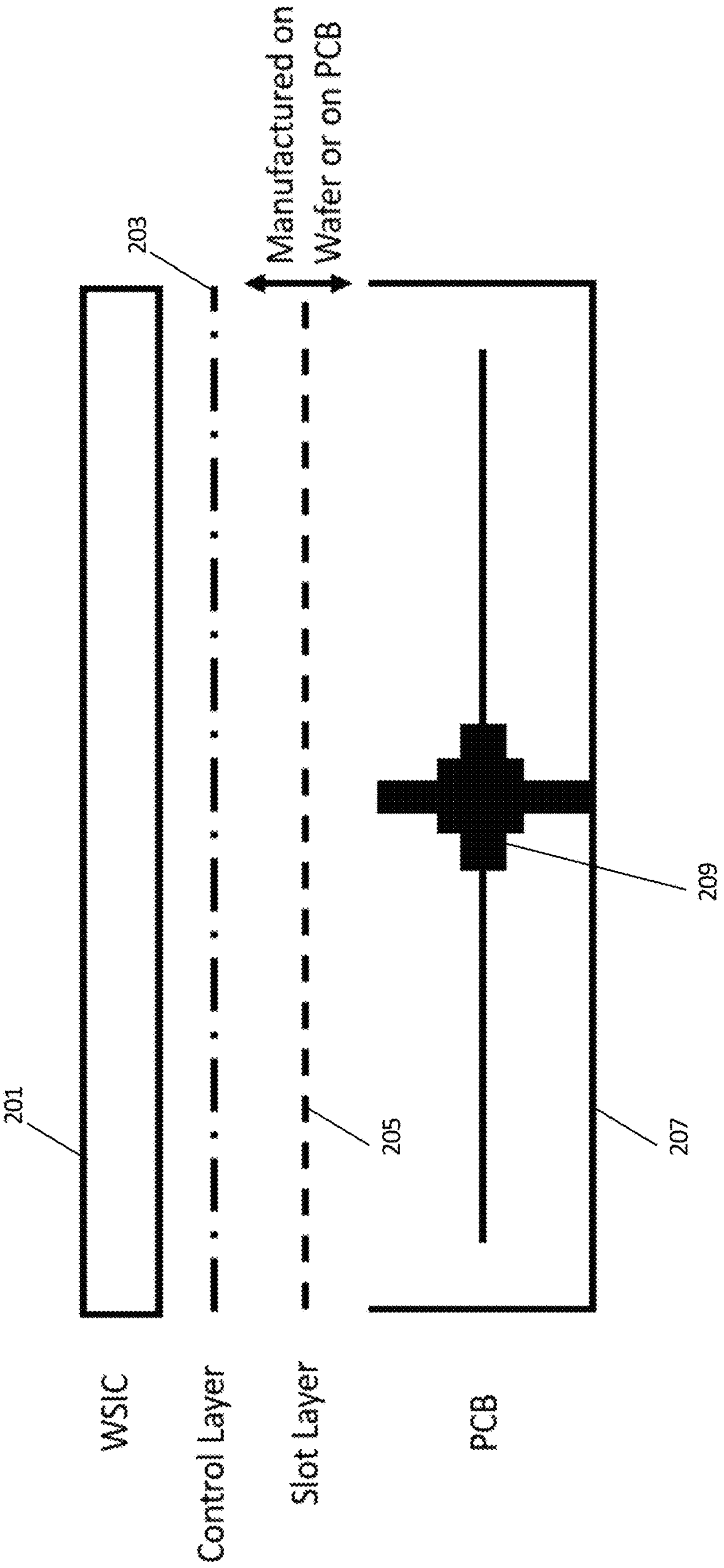
FIG. 2 is a schematic representation of a radial slot line antenna array according to an example.

FIG. 2 is a schematic representation of a radial slot line antenna array according to an example. Specifically, the example of FIG. 2 is a schematic representation in exploded form of the components of a radial slot line antenna array according to an example. A substrate 207, such as a printed circuit board (PCB) for example, is provided. In the example of FIG. 2, the substrate 207 comprises a radio frequency (RF) feed structure 209 for the RLSA array. A radiating surface 205 for the array comprises multiple slots arranged in a predefined configuration representing a slot element layout for the RLSA array. In an example, the radiating surface 205, defining a slot layer, can be formed on the substrate 207 and can comprise a metallic layer. A control layer 203 comprises a plurality of bias control lines. In an example, the bias control lines comprise metalized control tracks. The bias control lines can be formed on the substrate 207. A semiconductor wafer element 201 is provided. The element 201 comprises an active wafer. In an example, either or both of the radiating surface 205 and control layer 203 can be integrally formed within the element 201. Alternatively, the element 201 can be bonded to either one or all of the radiating surface 205, control layer 203, and substrate 207.

According to an example, a set of active switching devices is integrally formed in the semiconductor wafer element 201. Each switching device is formed in the wafer element 201 with a selected position, whereby to structurally align the switching devices with respective slots of the radiating surface 205. Accordingly, the element 201 comprises a set of active switching devices so aligned with slots of the radiating surface 205, whereby to enable regulation of slot element resonant frequencies. Driving circuitry to individually address the active switching devices is integrally formed in the semiconductor wafer element 201. In an example, the driving circuitry is configured to individually address the active switching devices, whereby to enable selected bias signals to be applied to the active switching devices using the bias control lines of the control layer 203. In an example, active switching devices can comprise any one or more of varactor diodes, MEMS switches, or mempacitors. Drive circuitry elements may be, e.g., simple transistors configured to drive relatively simple switching devices such as varactor diodes, or may be more complex sub circuits comprising, e.g., MOSFETs for high voltage drivers when driving, e.g., MEMS devices.

Referring to FIG. 2, the element 201 can be bonded to the substrate 207. In an example, either one or both of the layers 203, 205 can be fabricated separately or as part of either the substrate 207 or element 201. Accordingly, either one or both of the layers 203, 205 can be interposed between and bonded to the element 201 and other layers of the structure such as the substrate 207. That is, slots layer 205 can be manufactured or fabricated on the substrate 207 or as part of the wafer-scale IC (WSIC) 201. Similarly, control layer 203 can be manufactured or fabricated on the substrate 207 or as part of the WSIC 201.

Thus, according to an example, active switching devices, defining a switching surface for an RLSA array can be manufactured or fabricated as a WSIC. This reduces processing stages in the transfer of the switching components to the product, minimises unwanted parasitic artefacts as a result of packaging, allows trimming and tuning of devices on the wafer to allow for an electrically more uniform surface. In addition, it offers the ability to make larger RLSA arrays as the WSIC surface can be tessellated, and the cost of the product thus reduced due to the reduced number of processing and packaging steps required. For example, a single large PCB can be manufactured and WSICs can then be placed in a tessellated manor on the PCB surface. This is particularly advantageous for larger antennas for use in, e.g., SATCOM where larger gains and therefore diameters are required.

In an example, substrate 207, comprising a PCB for example, can be manufactured using traditional PCB manufacturing techniques or alternatively using machined materials.

According to an example, a set of active switching devices is therefore fabricated within or onto a whole semiconductor wafer element, which can then be bonded onto the top surface of the PCB substrate (with intermediate layers if applicable, such as layer 205 and or layer 203 for example). Alignment of the wafer element 201 and the substrate 207 can be achieved to very high tolerances. In an example, the wafer element 201 can be placed over the entire top surface of the substrate 207, thereby covering all the slots. In some implementations a wafer 201 can be a silicon wafer. As such, it may have a high permittivity Er=10. Considering that the wafer 201 can be of the order of ~200-400 μm thick, this can have the effect of detuning a slot. According to an example, in order to prevent this occurring, Deep Reactive Ion Etching (DRIE) can be utilised to remove the, e.g., silicon substrate in the vicinity of a slot. DRIE can also be used to relieve mismatches in coefficients of thermal expansion (CTE) or stress points in the wafer.

Figure 3:
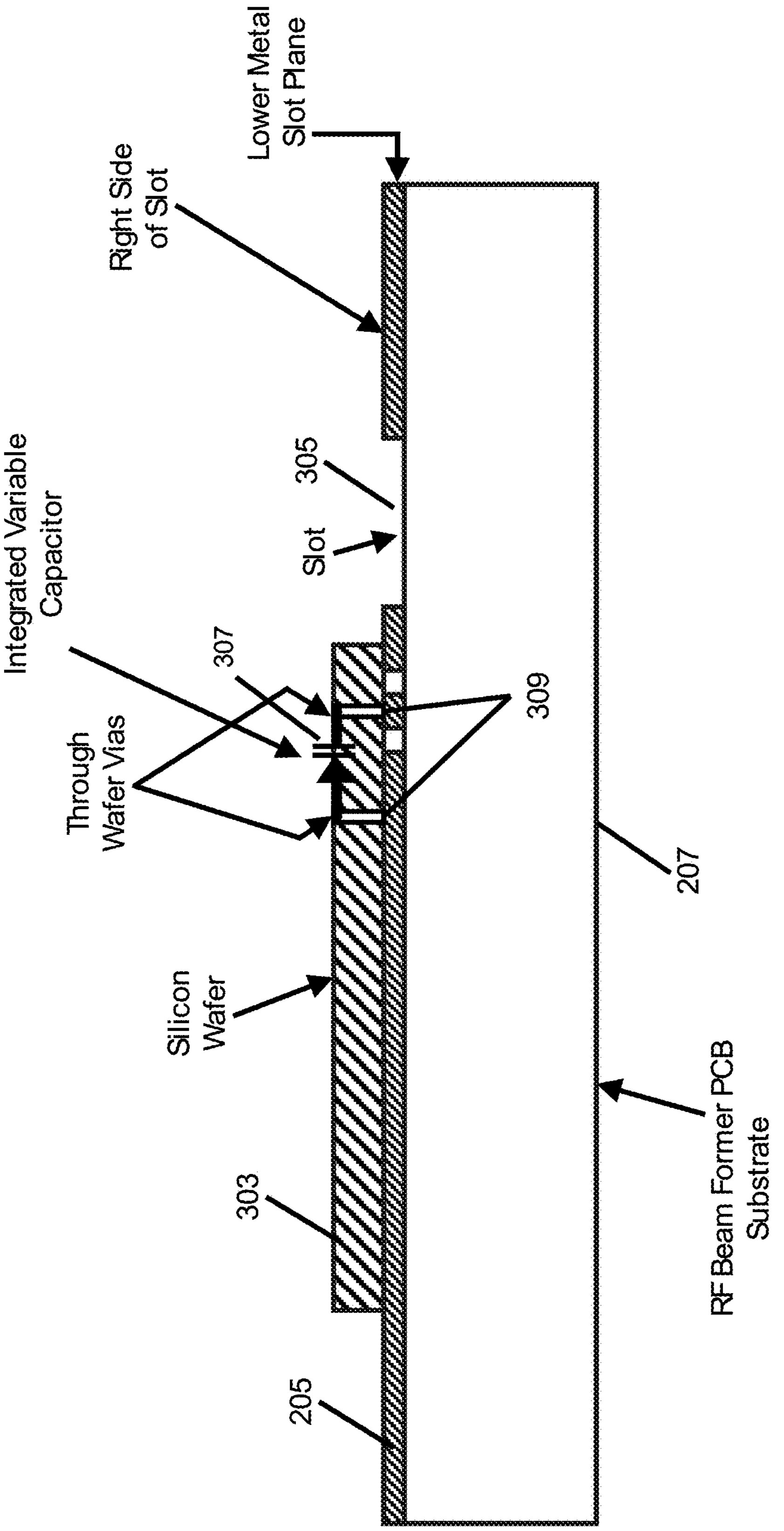
FIG. 3 is a schematic representation of part of an RLSA array according to an example.

FIG. 3 is a schematic representation of part of an RLSA array according to an example. In the example of FIG. 3, radiating surface 205 is provided on substrate 207. A slot 305 is provided in the radiating surface 205, with a corresponding active switching device (schematically depicted at 307 for ease of illustration clarity) provided in the wafer element 303. In the example of FIG. 2, drive circuitry in the form of transistor is depicted. For a MEMS switch for example, the control circuitry would be more complex, but ultimately dependent on the MEMS switch type. As can be seen from FIG. 3, and as described above, parts of the wafer element 303 have been removed in the vicinity of a slot 305.

In an example, forming the slot layer 205 on the wafer means that through silicon vias 309 can be provided to connect pads on the bottom of the wafer to pads on the top. As noted above, the slot layer 205 can be made on the PCB. In another example, a slot layer 205 can be manufactured from metal, such as Aluminium or Molybdenum, which might be plated. Using this as the slot layer 205 means that it can be bonded directly to the wafer element 303, especially in the case of Molybdenum case where the CTEs of the materials are matched. Accordingly, the active switching devices and control circuitry can be made on or within the wafer element 303. As such, it is not necessary to link control devices manufactured on the wafer to control lines manufactured on the substrate 207. There is capacitive coupling between the control devices and the slot layer 205.

According to an example, drive circuitry and active switching devices can be manufactured using standard CMOS foundry processing techniques, thereby enabling electronic trimming, self-test, redundancy and reconfiguration, which cannot be achieved in a packaged device placed onto the PCB 207 directly. In an example, and as part of a CMOS process, a multilevel metal overcoat can be applied to the top of the driver switching device pair. Furthermore, metallisation of the edges of the wafer element 303 can be performed by, e.g., sputtering copper onto the silicon wafer surface. This may be a process supplementary to the initial CMOS process and be completed as per the flow chart in FIG. 6 for example.

In a CMOS process, lithography is used to create individual dies on a wafer. Accordingly, in the CMOS process the steppers used in the lithography process use a 4 or 5:1 reduction in the optics. This means that, in general, only a small portion of a wafer can be patterned at any one time. However, according to an example, a 4:1 stepper lithography process can be used to fabricate dies on the wafer 303. Then a 1:1 process can be used to join the individual dies with metallised layers, i.e., the tracks that link the switches together. To minimise the number of dies needed in the lithography process a compromise in design may be made in which the location of the die and capacitive component is located differently about each radiating element.

Figure 4:
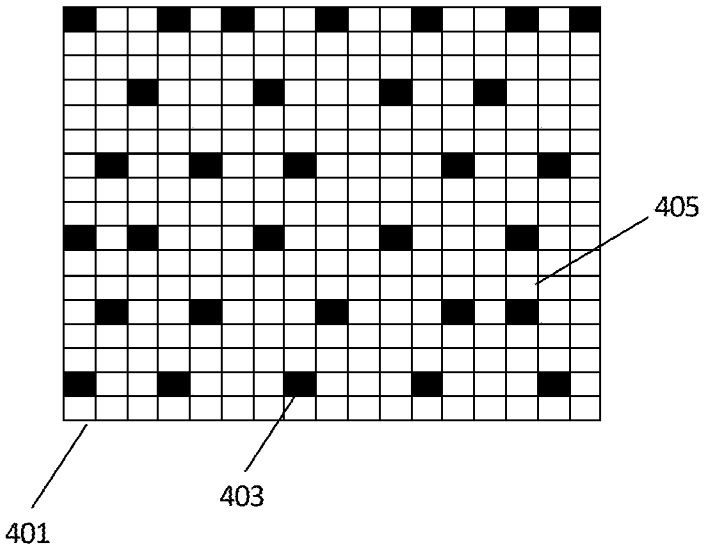
FIG. 4 is a schematic representation of the lithography process used on a wafer element according to an example.

In an example, in which MEMS switches are implemented, a void can be created in the wafer by, e.g., layering additional structure above the device to create a hermetically sealed cavity for the MEMS FIG. 4 is a schematic representation of a wafer element according to an example. In the example of FIG. 4 the wafer element 401 comprises multiple dies 403. Each die coloured black can comprise an active switching device. These are, in the example of FIG. 4, joined together using the bias control lines 405. The wafer 401 is therefore sparsely populated but does not require dicing in post processing stages. Furthermore, as described above, all drive, tuning and self-test electronics can be included with the active switching devices meaning that any cross-wafer variation can be accounted for in a manufacturing process.

Figure 5:
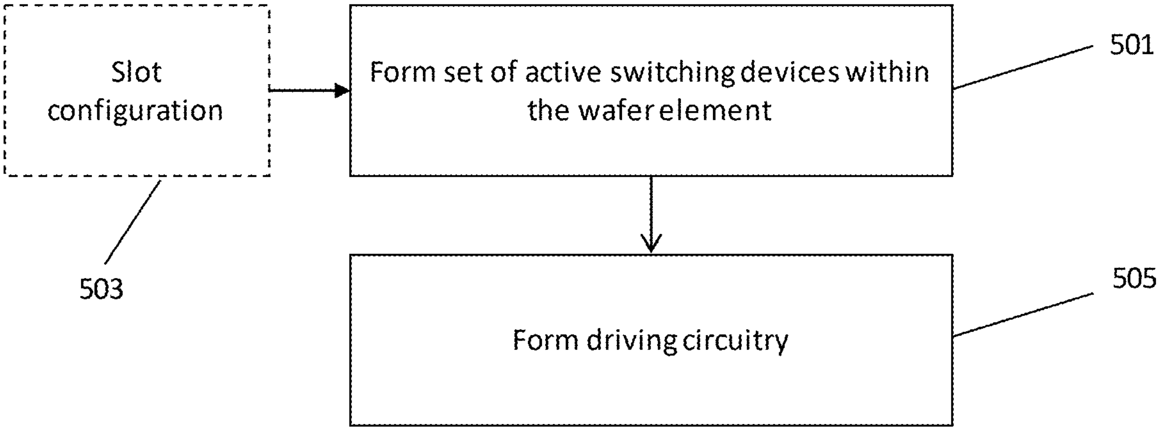
FIG. 5 is a flow chart of a method for manufacturing a switching structure for a radial slot line antenna array using a single semiconductor wafer element according to an example.

FIG. 5 is a flow chart of a method for manufacturing a switching structure for a radial slot line antenna array using a single semiconductor wafer element according to an example. In block 501 a set of active switching devices is formed within the wafer element. As described above, a position of each active switching device on the wafer element can be selected according to a predefined configuration 503 representing a slot element layout for the RLSA array. In block 505, driving circuitry is formed. In an example, the driving circuitry can be formed by doping the wafer element for example and can be dependent on the active switching device and resultant drive circuitry required. The driving circuitry is configured to individually address respective ones of the set of active switching devices, whereby to enable selected bias signals to be applied to the set of active switching devices, e.g., using the bias control lines.

Figure 6:
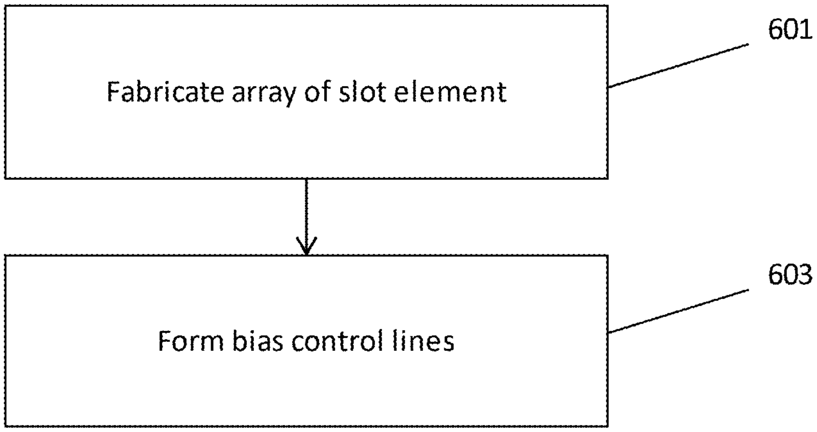
FIG. 6 is a flow chart of a method for manufacturing a switching structure for a radial slot line antenna array using a single semiconductor wafer element according to an example.

FIG. 6 is a flow chart of a method for manufacturing a switching structure for a radial slot line antenna array using a single semiconductor wafer element according to an example. In block 601, an array of slot elements for the RLSA array is fabricated on the wafer element by forming multiple slots according to the predefined configuration representing the slot element layout for the RLSA array. In block 603 a plurality of bias control lines within the wafer element are formed for the set of active switching devices.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The invention claimed is:

1. A method for manufacturing a switching structure for a radial line slot antenna (RLSA) array using a single semiconductor wafer element, the method comprising:

forming a set of active switching devices within the wafer element, a position of each active switching device on the wafer element selected according to a predefined configuration representing a slot element layout for the RLSA array; and forming driving circuitry within the wafer element, the driving circuitry for individually addressing respective ones of the set of active switching devices, whereby to enable selected bias signals to be applied to the set of active switching devices.

2. The method of claim 1, further comprising:

fabricating an array of slot elements for the RLSA array on the wafer element by forming multiple slots according to the predefined configuration representing the slot element layout for the RLSA array.

3. The method of claim 1, further comprising:

fabricating an array of slot elements for the RLSA array on a substrate structure for the RLSA array.

4. The method of claim 3, further comprising:

bonding the substrate structure to the wafer element.

5. The method of claim 1, further comprising:

forming a plurality of bias control lines within the wafer element for the set of active switching devices.

6. The method of claim 1, further comprising:

forming a plurality of bias control lines on a control layer.

7. The method of claim 6, wherein the control layer is formed within the wafer element.

8. The method of claim 6, further comprising:

bonding the control layer to the wafer element.

9. A radial line slot antenna array, comprising:

a substrate comprising a radiating surface for the array, the radiating surface comprising multiple slots arranged in a predefined configuration representing a slot element layout for the radial line slot antenna array;

a set of active switching devices integrally formed in a semiconductor wafer element bonded to the substrate, each switching device structurally aligned with a respective slot, whereby to enable regulation of slot element resonant frequencies;

a plurality of bias control lines integrally formed in the semiconductor wafer element; and driving circuitry integrally formed in the semiconductor wafer element and configured to individually address the active switching devices, whereby to enable selected bias signals to be applied to the active switching devices using the bias control lines.

10. The radial line slot antenna array of claim 9, wherein at least one of the set of active switching devices comprise micro-electromechanical system (MEMS) switches.

11. The radial line slot antenna array of claim 10, wherein the MEMS switches comprise charge-controlled or field-controlled MEMS switches.

12. The radial line slot antenna array of claim 10, wherein at least one of the MEMS switches comprise cantilever, bridge, or diaphragm type MEMS.

13. The radial line slot antenna array of claim 9, wherein at least one of the set of active switching devices comprise varactor diodes and/or memcapacitors.

14. The radial line slot antenna array of claim 9, wherein the driving circuitry comprises at least one high voltage driver configured to supply a high voltage bias signal.

15. The radial line slot antenna array of claim 9, wherein the radiating surface comprises a metallic layer interposed between and bonded to the semiconductor wafer element and the substrate.

* * * * *